United States Patent [19]

Gregorio

[11] Patent Number: 4,943,238
[45] Date of Patent: Jul. 24, 1990

[54] AUTOMOTIVE ELECTRONIC INSTRUCTIONAL AND DIAGNOSTIC TRAINING APPARATUS

[75] Inventor: Frank Gregorio, Ansonia, Conn.

[73] Assignee: Interplex Electronics, Inc., New Haven, Conn.

[21] Appl. No.: 284,303

[22] Filed: Dec. 14, 1988

[51] Int. Cl.$^5$ .............................................. G09B 19/00
[52] U.S. Cl. .................................... 434/224; 434/219;
434/366; 434/375; 371/3; 340/515; 73/117.3;
324/158 R
[58] Field of Search ............... 434/219, 224, 366, 373,
434/389; 340/425.5, 515; 364/424.03; 73/117.3;
371/3; 324/158 R

[56] References Cited

U.S. PATENT DOCUMENTS

| 4,464,120 | 8/1984 | Jensen | 434/219 |
| 4,542,505 | 9/1985 | Binoeder et al. | 371/3 X |
| 4,623,312 | 11/1986 | Crawford | 434/224 |

FOREIGN PATENT DOCUMENTS 1143937  4/1983  Canada .................. 434/224

Primary Examiner—Richard J. Apley
Assistant Examiner—Joe H. Cheng
Attorney, Agent, or Firm—McCormick, Paulding & Huber

[57] ABSTRACT

Instructional apparatus for training automotive service technicians in the skills required for isolating, identifying and repairing malfunctions in sophisticated automotive electronic systems uses a group of electronic circuit modules wherein each module simulates at least a portion of an automotive electronic circuit and one or more modules may be connected to form more complex circuits. One or more jumper wires associated with each of the modules may be altered by an instructor to create at least one fault condition representative of an electrical malfunction in the circuit associated with the module.

4 Claims, 4 Drawing Sheets

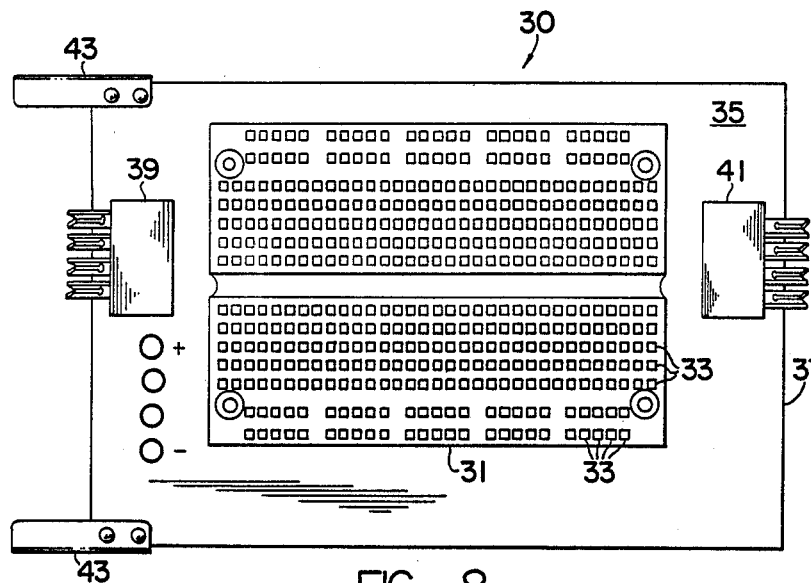
FIG. 8
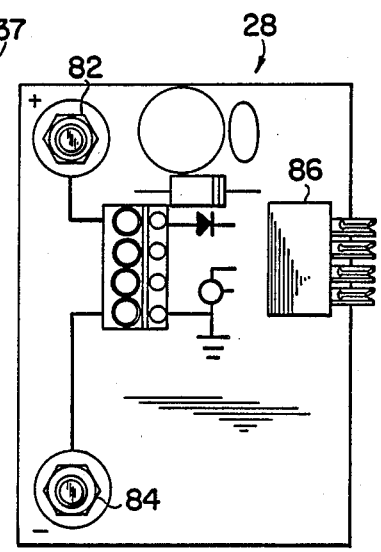
FIG. 7
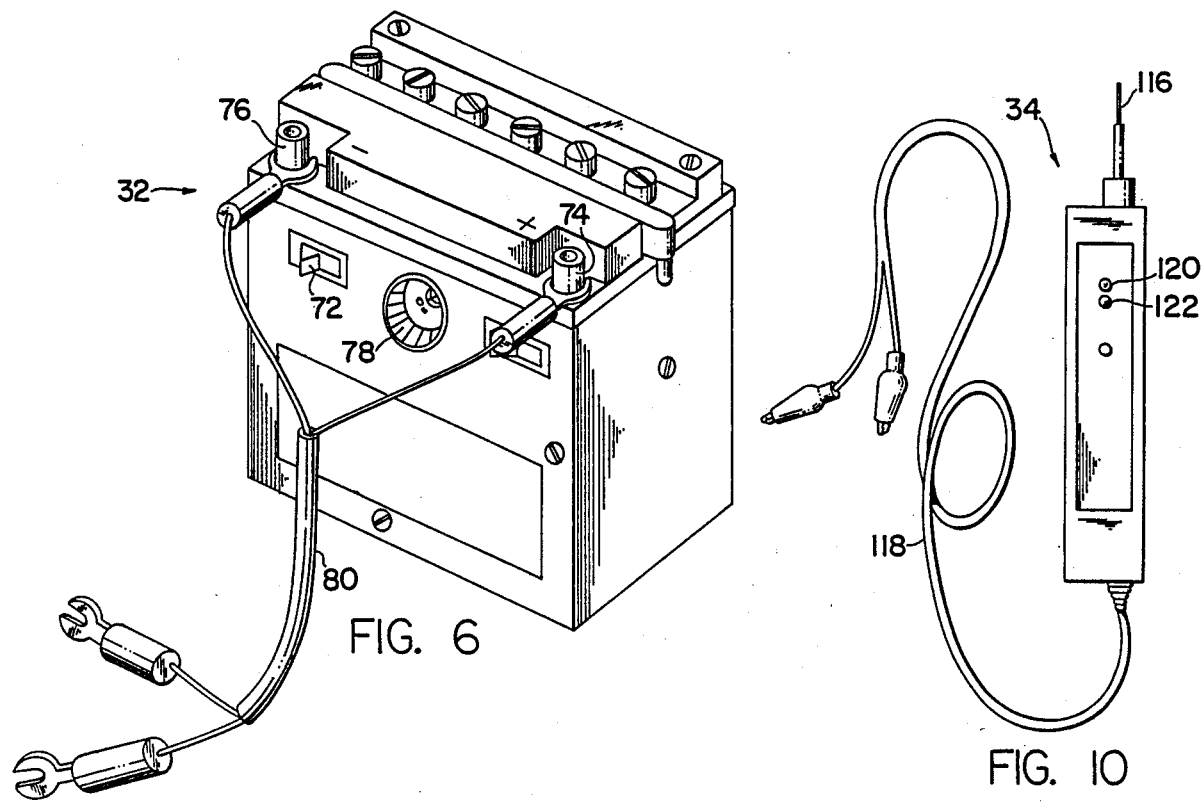
FIG. 6
FIG. 10

AUTOMOTIVE ELECTRONIC INSTRUCTIONAL AND DIAGNOSTIC TRAINING APPARATUS

FIELD OF THE INVENTION

The present invention relates generally to the field of automotive electronics. More particularly, the present invention provides an instructional apparatus for training automotive service technicians in the diagnosis and repair of typical automotive electrical and electronic circuit malfunctions.

BACKGROUND OF THE INVENTION

The large scale introduction of sophisticated electronic technology into the automobile began in the 1981 model year. Since that time, the electronic content of the average new car has steadily increased. The use of engine computers and other sophisticated electronic systems has enable automobile manufactures to meet a number of important objectives, particularly with regard to the industry's attempt to maximize fuel economy and minimize engine emissions.

The increased use of automotive electronics has created a corresponding need for automotive service technicians who can diagnose, and maintain "high tech" electronic systems. Such technicians must possess a level of technical competence which encompasses more than the skills required for utilizing manufacturer designed "on board diagnostics" or specialized testing equipment useful only for specific automotive electronic applications. Unfortunately, not every conceivable electronic system malfunction can be detected by an on-board computer or by specialized testing equipment. When these types of failures occur, a service technician must be able to independently trouble shoot an electronic system to isolate, identify and repair the particular electronic malfunction which is the cause of the system's problem.

SUMMARY OF THE INVENTION

It is the aim of the present invention to provide an instructional apparatus for training automotive service technicians in the skills required for isolating, identifying and repairing malfunctions in sophisticated automotive electronic systems.

It is a further aim of the present invention to provide an instructional apparatus comprising means for simulating at least a portion of an automotive electronic circuit.

It is a still further aim of the present invention to provide an instructional apparatus which comprises means for creating a fault condition representative of an automotive electronic system malfunction wherein a diagnostic procedure is followed to isolate and identify the electrical malfunction.

The present invention meets the above stated aims by providing an automotive electronic instructional and diagnostic training apparatus which comprises a group of electronic circuit modules each of which modules has at least one circuit which simulates at least a portion of an automotive electronic circuit in a group of automotive electronic circuits. The apparatus further includes an electrical power supply which is electrically connectable to the circuit modules and which provides electric power to one or more connected to the power supply to activate their respective circuits. Each of the circuit modules includes means which allows an instuctor to create at least one fault condition representative of an electrical malfunction in the circuit associated with the module. A student then follows a diagnostic procedure to isolate and identify the cause of the fault condition.

These and other aspects of the present invention will become apparent with reference to the following detailed description and accompanying drawings.

BRIEF DESCRIPTION OF THE DRAWINGS

FIG. 6 is a perspective view of the electrical power supply unit of the present invention which is utilized to provide electrical power to the components of the circuit modules.

FIG. 7 is a view of the electrical component side of a power connection module of the present invention which module functions as an electrical and mechanical connection between the electrical power supply and one or more circuit modules of the invention.

FIG. 8 is a view of the electrical component side of a breadboard module which is arranged to accept the leads to electrical components which may be interconnected to provide an electrical circuit not provided by the standard circuit modules supplied with the invention.

FIG. 10 is a view of a logic probe that may be used to isolate and identify simulated fault conditions in the electrical circuits associated with each respective circuit modules.

DETAILED DESCRIPTION OF A PREFERRED EMBODIMENT

Figure 1:
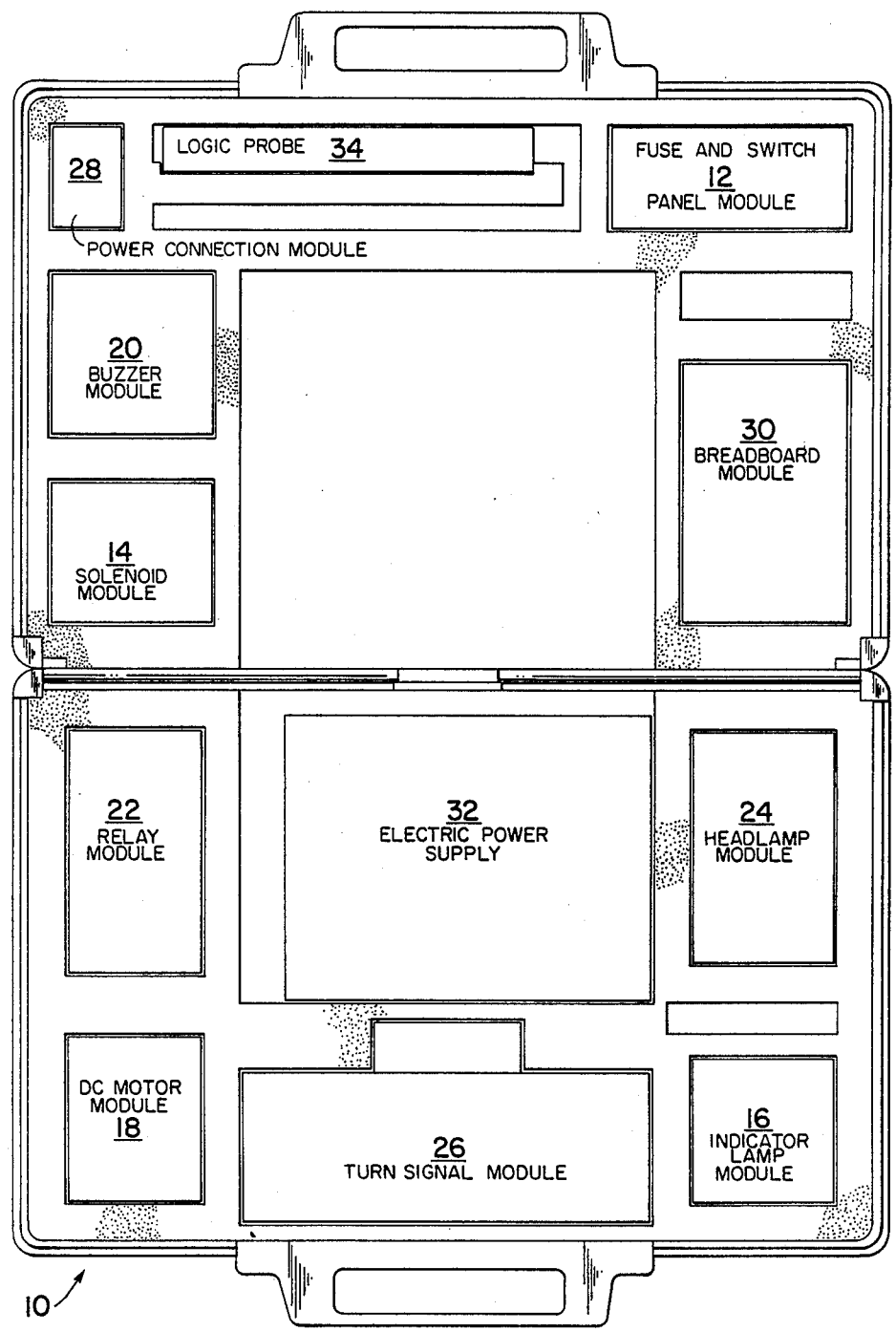
FIG. 1 is a plan view showing the instructional and diagnostic training apparatus of the present invention wherein the power supply and circuit modules are shown schematically contained within a molded plastic storage case.

FIG. 1 illustrates the automotive electronic instructional and diagnostic training apparatus of the present invention and which apparatus is shown stored in a carrying case for purposes of portability to the classroom environment. The apparatus, generally indicated at 10, includes a number of circuit modules which are shown as block outlines and are indicated at 12, 14, 16, 18, 20, 22, 24 and 26. The apparatus further includes a power connection module 28, a breadboard module 30, an electric power supply 32 and a logic probe 34 all of which are also shown as block outlines. The various circuit modules and associated components of the apparatus 10 will be discussed in more detail below with regard to FIGS. 2-10.

Figure 2:
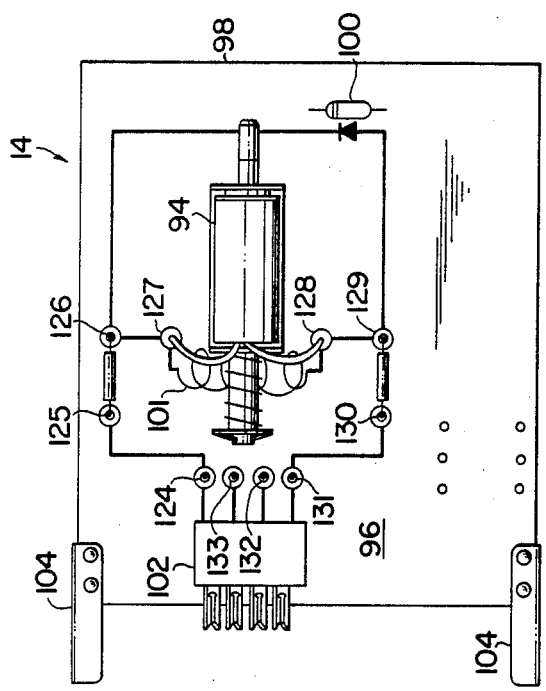
FIG. 2 is a view of the electrical component side of a fuse and switch panel circuit module of the present invention illustrating a typical electrical circuit arrangement in an automobile's electrical system.
Figure 3:
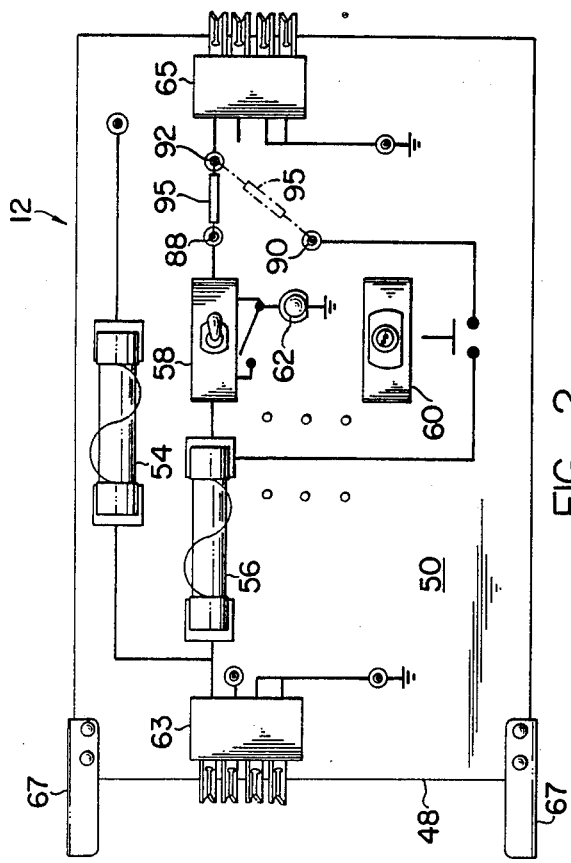
FIG. 3 is a view of the non-component mounted side of the circuit module illustrated in FIG. 2 wherein selective connecting paths between components are shown as removable wire jumpers.

Referring now to FIGS. 2-10, the various components of the apparatus 10 will be discussed in detail. As noted above, the apparatus 10 includes a number of circuit modules each of which is designed to simulate at least a portion of an automotive electronic circuit. FIG. 2 illustrates a representatives circuit module of the invention and in this instance the fuse and switch panel module, generally indicated at 12. The fuse and switch panel module 12 comprises a printed circuit board 48 having a component side 50 and as illustrated in FIG. 3 a non-component side 52. The module 12 further includes a number of electronic components mounted on the component side 50 of the circuit board 48 and which components include fuses 54 and 56, ignition switch 58, push release switch 60 and LED 62.

The circuit path which connects these electronic components is indicated generally at 64 in FIG. 3. As FIG. 3 illustrates, the circuit path 64 is mounted on the non-component side 52 of the circuit board 48. The circuit path 64 includes a number of removable circuit connecting elements. The circuit connecting elements comprise pin and socket connectors 66, 68 which have associated removable wire connectors or wire jumpers 70. It will be appreciated by those skilled in the art that the wire connectors may be removed from their associated pin and socket connectors and utilized to selectively connect a segment of circuit path 64 to another segment of said circuit path or disconnect a segment of circuit path 64 entirely. A diagramatic representation of circuit path 64 is illustrated on the component side 5 of the circuit board as is shown in FIG. 2.

Referring again to FIG. 2, the module 12 further includes input plug 63, output plug 65 and slide brackets 67. The plugs and brackets permit module 12 to be electrically connected to other circuit modules to simulate a larger portion of an automotive electronic circuit or a complete electronic circuit. Plug 63 and plug 65 interengage with corresponding output and input plugs, respectively, which are mounted on other circuit modules. The brackets 67 are designed to engage opposite edge portions of the other modules to both align corresponding plugs for connection and aid in holding connected modules together.

Figure 4:
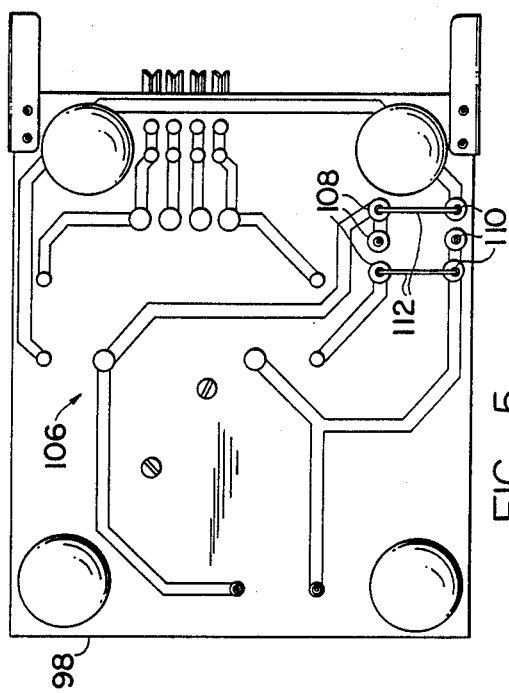
FIG. 4 is a view of the electrical component side of a solenoid circuit module of the present invention illustrating a typical electrical solenoid employed in an automotive electrical system.

Another representative circuit module is the solenoid module 14, shown in detail in FIG. 4. This module is designed to simulate the characteristics of solenoids in automotive electrical systems. The solenoid module 14 comprises a solenoid 94 mounted on the component side 96 of circuit board 98. The solenoid 94 is a typical automotive solenoid and includes a diode 100 in parallel with its excitation coil 101 for spike voltage suppression. The module 14 includes an input plug 102 and a pair of slide brackets 104 so that the module may be electrically connected to other circuit modules in the manner discussed above with regard to module 12.

Figure 5:
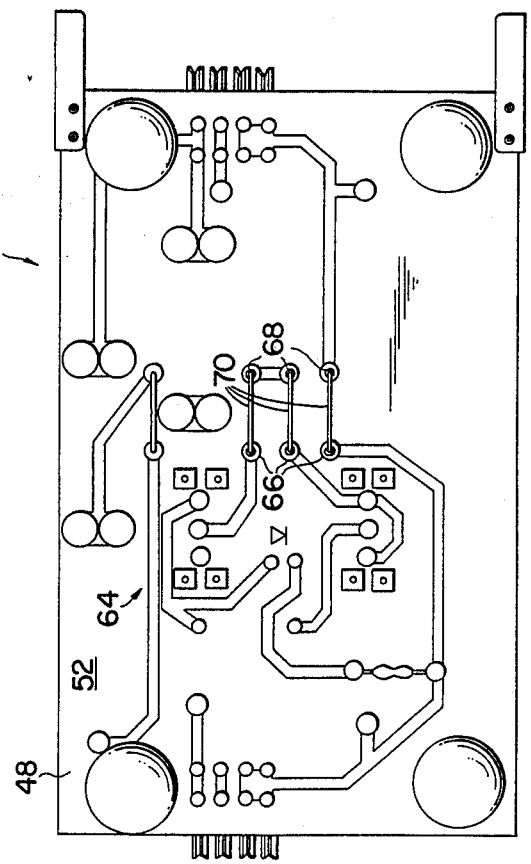
FIG. 5 is a view of the non-component mounted side of the circuit module illustrated in FIG. 4 wherein connecting paths between components are shown as removable wire jumpers.

The non-component side of circuit board 98 is shown in FIG. 5. Again, as is typical of all of the circuit modules, the non-component side of the circuit board carries a circuit path, indicated generally at 106, together with a number of removable circuit connecting elements comprising pin and socket connectors, 110 and removable wire connectors or wire jumpers 112.

It is important to recognize that the present invention comprises a number of different circuit modules and that modules 12 and 14 are merely representative of this larger group. For example, in its preferred embodiment the present invention includes: an indicator lamp module 16 designed to simulate an automotive lamp circuit; a DC motor module 18 designed to simulate the blower motor in a car's heating and (air conditioning) A/C system; a buzzer module 20 designed to simulate a warning buzzer circuit; a relay module 22 which simulates a typical automotive relay circuit; a headlamp module 24 which simulates a parallel electric circuit typically employed for a car's headlamps, and a turn signal module 26 designed to simulate a car's turn signal circuit.

Of course, the circuit modules provided in the preferred embodiment of the present invention are not intended to constitute an exhaustive catalogue of all possible circuit modules. Any number of other modules may be substituted or added as long as the modules are designed to simulate at least a portion of an automotive electronic circuit.

The apparatus 10 further comprises a circuit breadboard module 30, illustrated in FIG. 8. The circuit breadboard module provides a means for simplifying the design and construction of a number of circuit arrangements each of which simulates at least a portion of an automotive electronic circuit. Hence, the circuit breadboard module 30 permits the simulation of portions of automotive electronic circuits not already simulated by circuit modules or combinations of circuit modules. The design of such circuits are well known to those skilled in the art.

The circuit breadboard module 30 comprises a plastic block 31 having a series of interconnected sockets 33 mounted on the component side 35 of circuit board 37. Each series of sockets has five holes all connected together by a metal strip (not shown). The spacing of the sockets conforms to the pin spacing of many electronic components. Thus, the leads from such components are simply inserted into the sockets for rapid mounting and connection to other parts without the need for soldering. The circuit breadboard module 30 further includes an input plug 39, an output plug 41 and slide brackets 43 which permit the breadboard module 30 and any components mounted thereon to be electrically connected to other selected circuit modules in a manner similar to that described above.

Before turning to a discussion of how the modules operate and their use within the apparatus, the electric power supply used with the apparatus is illustrated in perspective view in FIG. 6 and the power connection module 28 which couples the electric power supply to the various circuit modules is illustrated in FIG. 7 is described as follows. The electric power supply of FIG. 6 indicated generally at 32 provides operating voltage for the circuit modules and comprises a transformer adapted to connect to a standard 110 volt AC outlet. A power switch 72 is used to cause the power supply to selectively provide a voltage potential which corresponds to the normal voltage output of an automotive battery when the engine is off and an increased voltage potential which corresponds to the normal voltage output of an automotive battery when the engine is running and the battery is being charged. In its preferred embodiment, the electric power supply 32 takes the form of a simulated car battery and includes a positive terminal 74 and a negative terminal 76 just as one would expect to find on an actual car battery. The electric power supply 32 further comprises a simulated cigarette lighter receptacle 78 which represents the cigarette lighter receptical commonly found in the dashboard or ashtray of a car. The receptical 78 is provided to receive a cooperating plug from electronic testing equipment to power the testing equipment. A pair of leads 80 is provided with the power supply and are used to electrically connect the power supply to the power connection module 28 as is described below.

Referring now to FIG. 7, the power connection module indicated generally at 28 is considerable in more detail. The power connectionn module 28 does not represent any particular part of a car's electrical system but rather provides a common connection between the electric power supply 32 and the various circuit modules as well as reverse voltage protection for the modules. The power connection module 28 comprises a positive terminal 82 and a negative terminal 84. Positive terminal 82 is connected to the positive terminal 74 on electric power supply 32 via one lead of the pair of leads 80. Similarly, negative terminal 84, which serves as electrical ground potential as illustrated in FIG. 7 by the standard symbol for electrical ground potential, connects to the negative terminal 76 on power supply 32 via the second lead of the pair of leads 80. The power connection module 28 further comprises an output plug 86 which permits electrical connection between the module 28 and the circuit modules.

Now that the electric power supply 32 and the power connection module 28 have been described, the operation of the fuse and switch panel module 12 is considered. The fuse and switch panel module 46 is designed to simulate several parts of a car's electrical system. Referring again to FIG. 2, fuse 54 is the "hot at all times" voltage because it has a direct connection to the positive terminal of the electric power supply 32. Fuse 56 connects positive voltage from the power supply 32 to the ignition switch 58 and the push release switch 60. When ignition switch 58 is closed light emitting diode (LED) 62 will light to indicate that ignition switch 58 is closed and that voltage is available at test point 88. When the push release switch 60 is depressed or closed, voltage is available at test point 90. Output plug 65 also has an associated test point 92 at which a positive voltage potential appears from either the ignition switch 58 or the push release switch 60 when a wire jumper 95 is placed between either test point 88 or 90 and test point 92. This makes operating voltage available at the output plug 65 of the fuse and switch panel module 12.

Figure 9:
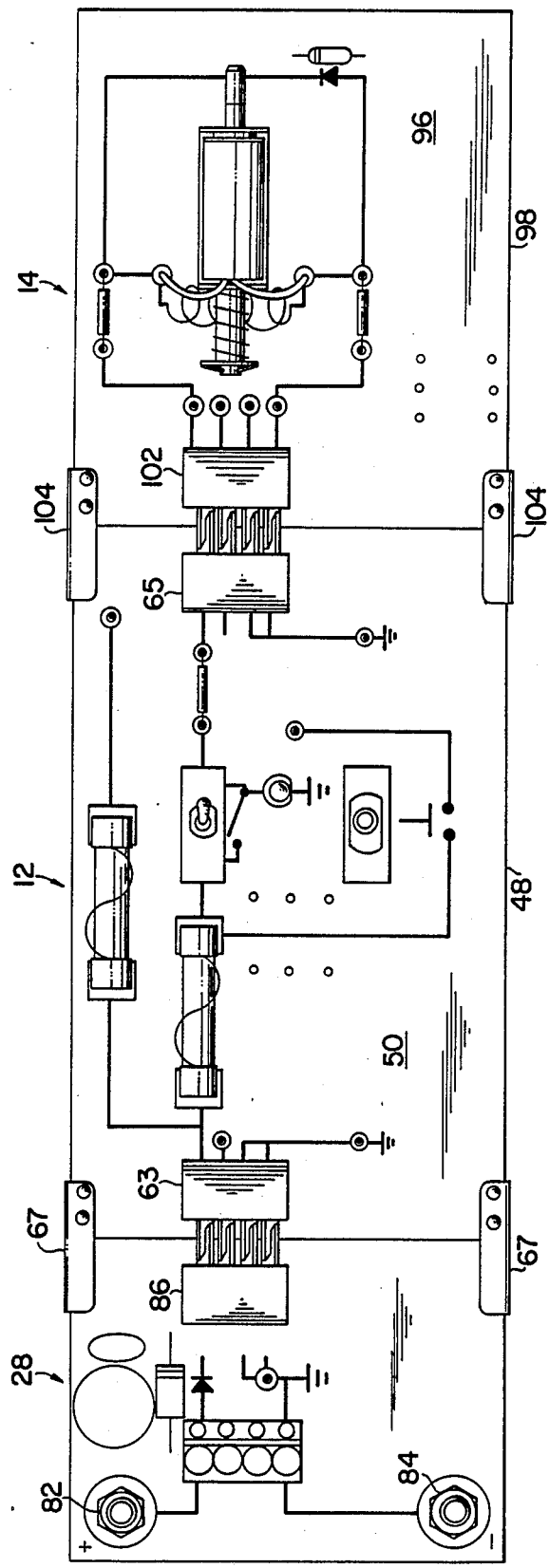
FIG. 9 is a view of a number of circuit modules of the present invention shown connected together as one possible automotive electronic circuit that may be formed with the circuit modules of the present invention.

As illustrated in FIG. 9, a starter motor circuit in an automobile may be simulated by the interconnection of the electrical power supply 32 through the power connection module 28, the fuse and switch panel module 12 and the solenoid module 14. Once the above modules have been connected, the instructor may create a fault condition in the circuit which simulates a malfunction in the automobile's starter circuit. For example, referring to FIGS. 4 and 5, the instructor could remove the wire connector 112 from the circuit connecting elements 108 and 110. This would open the circuit connecting one side of the solenoid 94 with the positive terminal of the electric power supply 32. The student would then perform a diagnostic testing procedure to isolate and identify the malfunction The diagnostic testing procedure may be carried out with the logic probe 34 illustrated in FIG. 10. The logic probe is entirely conventional and well known to those skilled in the art. The logic probe includes a test probe tip 116 and a power connection cable 118 adapted to connect to the electrical power supply 32. The logic probe 114 further includes two indicator lights 120 and 122. Indicator light 120 glows red when the probe measures a voltage above 10 volts. Indicator light 122 glows green when the test probe measures any voltage from 0 to 4 volts. When the probe measures a voltage between 4.1 volts and 10.0 volts there is no light output from either light 120 or 122.

To detect the fault created in the simulated starter circuit, the student touches the tip of the logic probe to the various diagnostic test points 124 to 133 located on the solenoid module. The student will detect positive voltage from the battery at diagnostic test points 124, 125 and 126 as indicated by the light 120 glowing red. However, when the tip of the logic probe is touched to the diagnostic test point 127, the indicator light 122 will glow green indicating that there is a circuit interruption or other fault at this point in the solenoid circuit which is blocking positive voltage from reaching the solenoid. Thus, by using the logic probe and proper troubleshooting techniques, the student is able to isolate and identify the specific malfunction created in the starter motor circuit.

It must be appreciated that FIG. 9 illustrates only one combination of modules which simulates an automotive electronic circuit. The circuit modules may be combined in a number of other combinations to simulate different portions of an automotive electronic circuit or complete automotive electronic circuits. Alternatively, each module may be used alone to simulate at least a portion of an automotive electronic circuit.

Accordingly, it will be obvious to those skilled in the art that various modifications may be made without departing from the spirit and scope of the present invention as described in the appended claims.

I claim:

1. An automotive electronic instructional and diagnostic training apparatus comprising:
    a group of electronic circuit modules, each module having at least one circuit path which simulates at least a portion of an automotive electronic circuit in a group of automotive electronic circuits;
    electrical power supply means electrically connectable to said modules for providing electrical power to said modules to activate their respective circuit paths, said electrical power supply means comprising, means for selectively providing a voltage potential which corresponds to the normal voltage potential output of an automotive battery when the enging is off and an increased voltage potential which corresponds to the normal voltage potential output of the automotive battery when the engine is running; and
    each module further including means for creating at least one fault condition representative of an electrical malfunction in said module.

2. An automotive electronic instructional and diagnostic training apparatus comprising:
    a group of electronic circuit modules each module having at least one circuit path which simulates at least a portion of an automotive electric circuit in a group of automotive electronic circuits;
    means for electrically connecting a plurality of said circuit modules selected from said group of electronic circuit modules to simulate at least a portion of an automotive electrical circuit;
    electrical power supply means electrically connectable to said modules for providing electrical power to said modules to activate their respective circuit paths, said electrical power supply means comprising means for selectively providing a voltage potential which corresponds to the normal voltage potential output of an automotive battery when the engine is off an an increased voltage potential which corresponds to the normal voltage potential output of the automotive battery when the engine is running; and each module further including means for creating at least one fault condition representative of an electrical malfunction in said module.

3. The automotive electronic instructional and diagnostic training apparatus of claim 10 wherein said means for connecting a plurality of said modules comprises slide brackets and electrical connection plugs mounted on said modules, said connecting plugs including a first terminal means for connection to said electrical power and a second terminal means for connection to electrical ground potential, said connection plugs being located and oriented on said module generally between said brackets and closer to one of said brackets whereby one of said modules may only be connected to another of said modules with said first terminal means of each connection plug connecting to one another and said second terminal means of each connection plug connecting to one another.

4. An automotive electronic instructional and diagnostic training apparatus comprising:

a group of electrical circuit modules each module having at least one circuit path which simulates at least a portion of an automotive electronic circuit in a group of automotive electronic circuits, said modules comprising a printed circuit board having a component side and a non-component side, a plurality of electronic components and at least one diagnostic indication means mounted on the component side of said board, a circuit path mounted on the non-component side of said board, to connected said electronic components and said diagnostic indication means, and a diagrammatic representation of said circuit path illustrated on the component side of said board;

means for connecting a plurality of said circuit modules selected from said group of electronic circuit modules to simulate at least a portion of an automotive electrical circuit, said means for connecting said circuit modules comprising a pair of slide brackets mounted on opposite edges of each one of said printed circuit boards, said brackets mounted on each one of said printed circuit boards adapted to slidably receive another one of said printed circuit boards and at least one electrical connection plug mounted on each one of said printed circuit boards, said plugs adapted to electrically interconnect a plurality of printed circuit boards;

electrical power supply means electrically connectable to said modules for providing electrical power to said modules to activate their respective electronic circuits, said electrical power supply means comprising a transformer adapted to connect to a standard 110 volt AC outlet and further adapted to selectively provide a voltage potential which corresponds to the normal output voltage potential of an automotive battery when the engine is off and an increased voltage potential which corresponds to the normal output voltage potential of the automotive battery when the engine is running;

each module further including means for creating at least one fault condition representative of an electrical malfunction in said module said means for creating at least one fault condition comprising removable circuit connecting elements, said connecting elements including a pluraltity of pin and socket connectors having associated removable wire connectors wherein said connecting elements are utilized to selectively connect a first segment of said circuit path to a second segment of said circuit path and are utilized to interrupt said circuit path;

a power connection module for providing a common electrical connection between said electrical power supply means and said electronic circuit modules, said power connection module further providing reverse voltage protection for said circuit modules;

means for simplifying the design and construction of at least a portion of an automotive electronic circuit, said means for simplifying comprising a circuit breadboard module adapted to connect to said electronic circuit module; and means for isolating and identifying said at least one fault condition representative of an electrical malfunction, said means for isolating and identifying comprising a logic probe adapted to connect to said electrical power supply means.

* * * * *